(12) United States Patent
Kaburaki et al.

(10) Patent No.: US 11,142,937 B2
(45) Date of Patent: Oct. 12, 2021

(54) OPENING AND CLOSING DEVICE

(71) Applicant: MITSUI KINZOKU ACT CORPORATION, Yokohama (JP)

(72) Inventors: Makoto Kaburaki, Yokohama (JP); Naoya Seto, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 204 days.

(21) Appl. No.: 16/367,205

(22) Filed: Mar. 27, 2019

(65) Prior Publication Data
US 2019/0301226 A1 Oct. 3, 2019

(30) Foreign Application Priority Data

Mar. 28, 2018 (JP) .............................. JP2018-062552

(51) Int. Cl.
| | |
|---|---|
| *B60J 5/00* | (2006.01) |
| *E05F 15/60* | (2015.01) |
| *E05D 3/02* | (2006.01) |
| *B60J 5/04* | (2006.01) |
| *E05F 15/63* | (2015.01) |

(52) U.S. Cl.
CPC ................ *E05F 15/60* (2015.01); *E05D 3/02* (2013.01); *B60J 5/042* (2013.01); *E05F 15/63* (2015.01); *E05Y 2900/531* (2013.01)

(58) Field of Classification Search
CPC .. E05F 15/60; E05F 15/63; E05D 3/02; E05D 3/127; B60J 5/042; B60J 5/0431; E05Y 2900/531

USPC ..... 49/333, 334, 335, 338, 502; 296/146.11, 296/146.12

See application file for complete search history.

(56) References Cited

U.S. PATENT DOCUMENTS 4,121,382 A * 10/1978 Dietrich ................ E05F 15/614
49/280
4,665,586 A * 5/1987 Kinaga .................... E05D 3/10
16/319

(Continued)

FOREIGN PATENT DOCUMENTS

| JP | S56-163915 A | 12/1981 |
|---|---|---|
| JP | S61-104226 A | 7/1986 |

(Continued)

OTHER PUBLICATIONS

Office Action dated Aug. 25, 2020 for corresponding Japanese Patent Application No. 2018-062552.

*Primary Examiner* — Jerry E Redman
(74) *Attorney, Agent, or Firm* — Foley & Lardner LLP

(57) ABSTRACT

An opening and closing device includes an upper arm and a lower arm spaced apart in an up-and-down direction and extend between a vehicle door and a vehicle body, a connecting member configured to connect a first end portion of the upper arm and a first end portion of the lower arm, a body-side upper hinge and a body-side lower hinge attached to the vehicle body so as to be spaced apart in the up-and-down direction and support the connecting member rotatably, a door-side upper hinge attached to an inner panel of the vehicle door to support a second end portion of the upper arm rotatably, and a door-side lower hinge attached to the inner panel of the vehicle door to support a second end portion of the lower arm rotatably.

6 Claims, 8 Drawing Sheets

(56) References Cited

U.S. PATENT DOCUMENTS

| | | | | |
|---|---|---|---|---|
| 4,665,587 A * | 5/1987 | Kinaga | E05D 3/10 | 16/319 |
| 4,713,862 A * | 12/1987 | Kinaga | E05D 3/10 | 16/223 |
| 4,716,623 A * | 1/1988 | Kinaga | E05D 3/10 | 16/223 |
| 5,398,988 A * | 3/1995 | DeRees | B60J 5/0479 | 296/155 |
| 5,685,046 A * | 11/1997 | Neag | E05D 3/127 | 16/366 |
| 6,052,870 A * | 4/2000 | Hagenlocher | E05D 3/147 | 16/343 |
| 6,305,737 B1 * | 10/2001 | Corder | B60J 5/0479 | 296/146.11 |
| 6,606,763 B1 * | 8/2003 | Bruckner | E05D 3/147 | 16/366 |
| 6,629,337 B2 * | 10/2003 | Nania | E05D 3/127 | 16/334 |
| 6,817,065 B1 * | 11/2004 | Bruckner | E05D 3/147 | 16/366 |
| 6,938,303 B2 * | 9/2005 | Watson | E05D 3/127 | 16/247 |
| 7,000,977 B2 * | 2/2006 | Anders | E05D 15/48 | 296/146.12 |
| 7,438,346 B1 * | 10/2008 | Breed | E05C 17/203 | 296/146.12 |
| 7,856,759 B2 * | 12/2010 | Elliott | E05D 15/58 | 49/358 |
| 7,896,425 B2 * | 3/2011 | Elliott | E05D 15/0608 | 296/146.12 |
| 7,931,327 B2 * | 4/2011 | Ertl | E05D 15/28 | 296/146.8 |
| 7,950,109 B2 * | 5/2011 | Elliott | E05D 3/127 | 16/366 |
| 8,082,630 B2 * | 12/2011 | Sprague | E05D 5/062 | 16/369 |
| 8,096,606 B2 * | 1/2012 | Hanaki | E05D 15/101 | 296/155 |
| 8,171,673 B2 * | 5/2012 | Helms | E05F 15/622 | 49/341 |
| 8,234,816 B2 * | 8/2012 | Heuel | E05D 15/58 | 49/216 |
| 9,217,269 B2 * | 12/2015 | Lobkovich | E05D 15/1005 | |
| 9,676,256 B2 * | 6/2017 | Elie | B60J 5/047 | |
| 10,787,845 B2 * | 9/2020 | Trentin | E05D 3/122 | |
| 2002/0073507 A1 * | 6/2002 | Presley | E05D 3/145 | 16/333 |
| 2003/0102692 A1 * | 6/2003 | Mooy | E05D 5/062 | 296/146.11 |
| 2003/0107237 A1 * | 6/2003 | Brodt | B60J 5/0479 | 296/146.12 |
| 2005/0093337 A1 * | 5/2005 | Herrmann | E05D 3/127 | 296/146.11 |
| 2006/0028049 A1 * | 2/2006 | Lang | E05D 3/127 | 296/146.11 |
| 2008/0222844 A1 * | 9/2008 | Broadhead | E05D 3/16 | 16/231 |
| 2010/0171336 A1 * | 7/2010 | Elliott | B60J 5/06 | 296/146.12 |
| 2010/0301631 A1 * | 12/2010 | Scott | E05D 3/127 | 296/146.12 |
| 2011/0131767 A1 * | 6/2011 | Heuel | B60J 5/06 | 16/96 R |

FOREIGN PATENT DOCUMENTS

| | | |
|---|---|---|
| JP | H05-112129 A | 5/1993 |
| JP | H07-076971 A | 3/1995 |
| JP | 2768084 B2 | 6/1998 |

* cited by examiner

OPENING AND CLOSING DEVICE

CROSS-REFERENCE TO RELATED APPLICATIONS

This application is based on and claims priority under 35 USC 119 from Japanese Patent Application No. 2018-062552 filed on Mar. 28, 2018, the contents of which are incorporated herein by reference.

TECHNICAL FIELD

The present disclosure relates to an opening and closing device that is provided on a door of a vehicle such as a motor vehicle.

BACKGROUND

As a side door of a motor vehicle, side doors are widely adopted which are opened and closed in a width direction of a vehicle. An opening and closing device that connects a side door of this type to a vehicle body typically includes a pair of hinges that are mounted on the vehicle body in such a way as to be spaced apart from each other in an up-and-down direction of the vehicle, so that the side door is turned or rotated about a rotational shaft that passes through the pair of hinges to be opened or closed. Additionally, an opening and closing device is also known which includes a driving unit that opens and closes a side door.

On the other hand, an opening and closing device described in Japanese Patent No. 2768084 (PTL 1) includes a hinge arm having a pair of body-side support shafts at one end portion and a pair of door-side support shafts at the other end portion thereof, so that a side door can be rotated about the two pairs of support shafts of the pair of body-side support shafts and the pair of door-side support shafts. Then, the opening and closing device described in PTL 1 includes two motors that are a motor that drives to rotate the side door about the body-side support shafts and a motor that drives to rotate the side door about the door-side support shafts.

SUMMARY

In a side door that is designed to rotate about one shaft, there may be a case where a driver or an occupant has a problem or difficulty in getting in or getting out of a vehicle at a narrow place where the degree of opening of the door is limited. For example, the driver or occupant needs to twist his or her body in a gap between the door and a door frame of a vehicle body. In addition, when the driver or occupant gets out of the vehicle, he or she tends to rub his or her shoes against an inner trim of the door to get it dirty from time to time. It is desirable that the door opens 50 degrees or more for the driver or occupant to get in and out of the vehicle without any difficulty. In other words, in terms of a distance between the door and the door frame at a portion near a rear end of a center console, it is desirable that a distance of 200 mm or more is ensured.

In the opening and closing device described in PTL 1, the side door is rotated not only about the body-side support shafts but also about the door-side support shafts, whereby a space that is wide enough for the driver or occupant to get in and out of the vehicle can be ensured without increasing the distance between a rear end of the door and the door frame. In the opening and closing device described in PTL 1, however, the body-side end portion of the hinge arm that is connected to the vehicle body is bifurcated into an upper end portion and a lower end portion, and the body-side support shafts are provided individually at the upper end portion and the lower end portion. The weight of the side door is exerted on the upper end portion and the lower end portion, whereby there are fears that the upper end portion and the lower end portion are displaced independently of each other due to the load exerted thereon, resulting in a risk of a problem being caused in that the side door cannot be opened and closed smoothly.

Illustrative aspects of the disclosure provide an opening and closing device that can ensure a space that is wide enough for a driver or occupant to get in and out of a vehicle even in a narrow place where the degree of opening of a door is limited and that has a superior reliability in operation.

According to one illustrative aspect, there may be provided an opening and closing device for connecting a vehicle door to a vehicle body so as to be openable and closable in a width direction of a vehicle, the opening and closing device comprising: an upper arm and a lower arm that are disposed so as to be spaced apart in an up-and-down direction of the vehicle and to extend between the vehicle door and the vehicle body; a connecting member configured to connect a first end portion of the upper arm and a first end portion of the lower arm together; a body-side upper hinge and a body-side lower hinge that are attached to the vehicle body so as to be spaced apart in the up-and-down direction of the vehicle and to support the connecting member rotatably; a door-side upper hinge attached to an inner panel of the vehicle door to support a second end portion of the upper arm rotatably; and a door-side lower hinge attached to the inner panel of the vehicle door to support a second end portion of the lower arm rotatably.

According to the disclosure, it is possible to provide the opening and closing device that can ensure the space that is wide enough for the driver or occupant to get in and out of the vehicle even in the narrow place where the degree of opening of the door is limited and that has a superior reliability in operation.

BRIEF DESCRIPTION OF DRAWINGS

Illustrative embodiments of the present disclosure will be described in detail based on the following figures, wherein.

DETAILED DESCRIPTION

Figure 1:
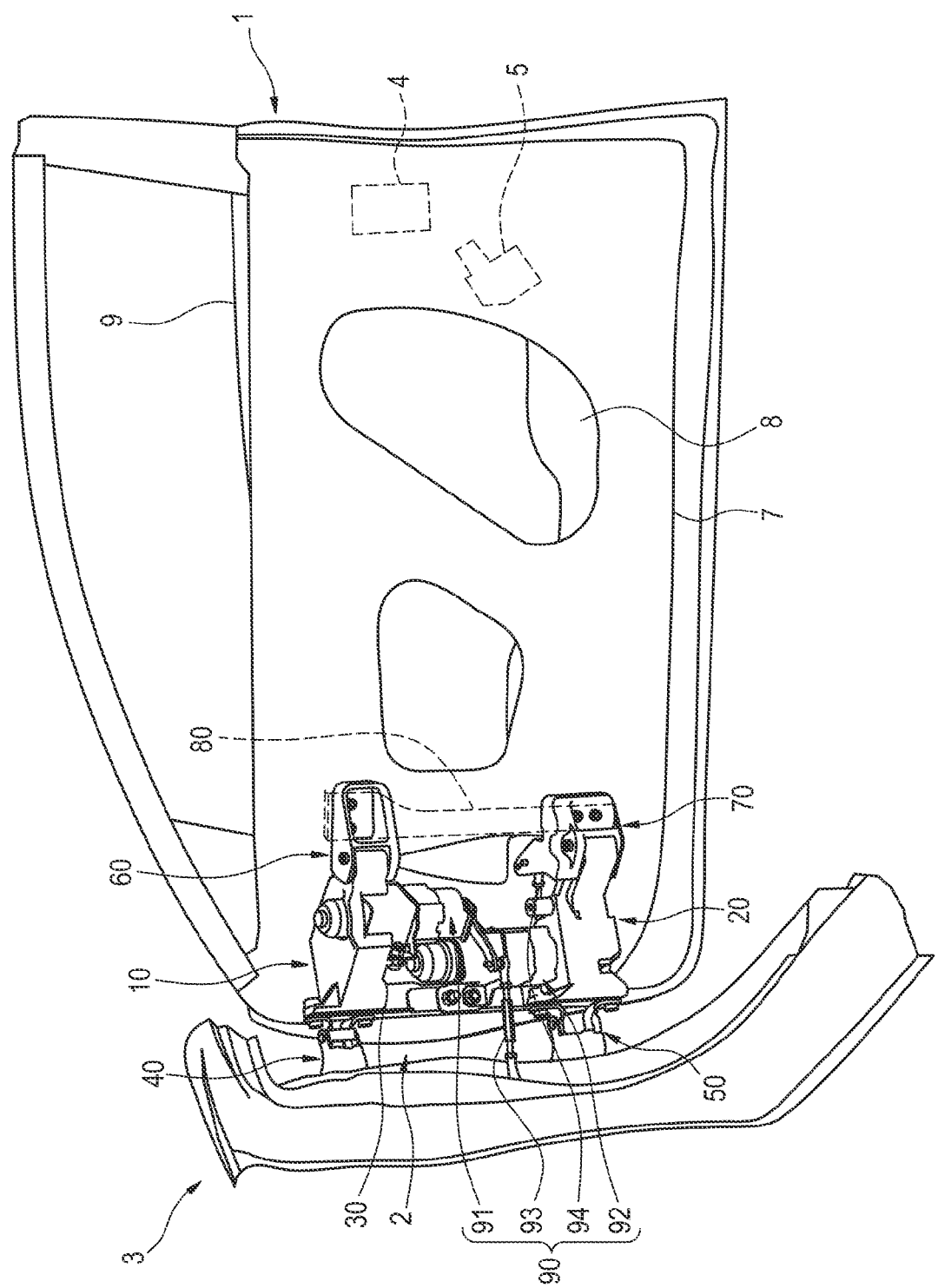
FIG. 1 is a perspective view of an example of a vehicle that illustrates an illustrative embodiment of the disclosure.
Figure 2:
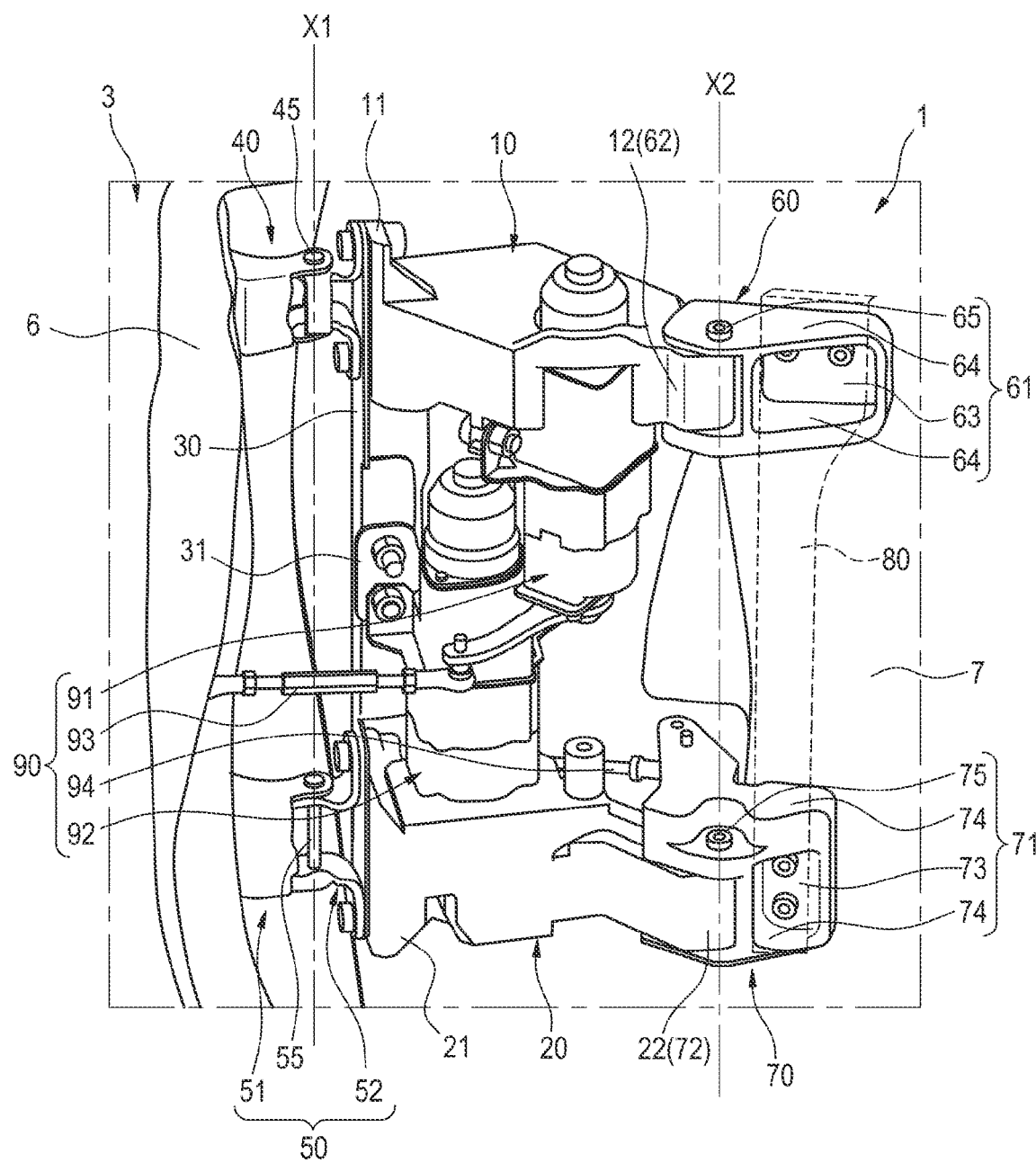
FIG. 2 is a perspective view showing an opening and closing device of the vehicle shown in FIG. 1 in an enlarged fashion.
Figure 3:
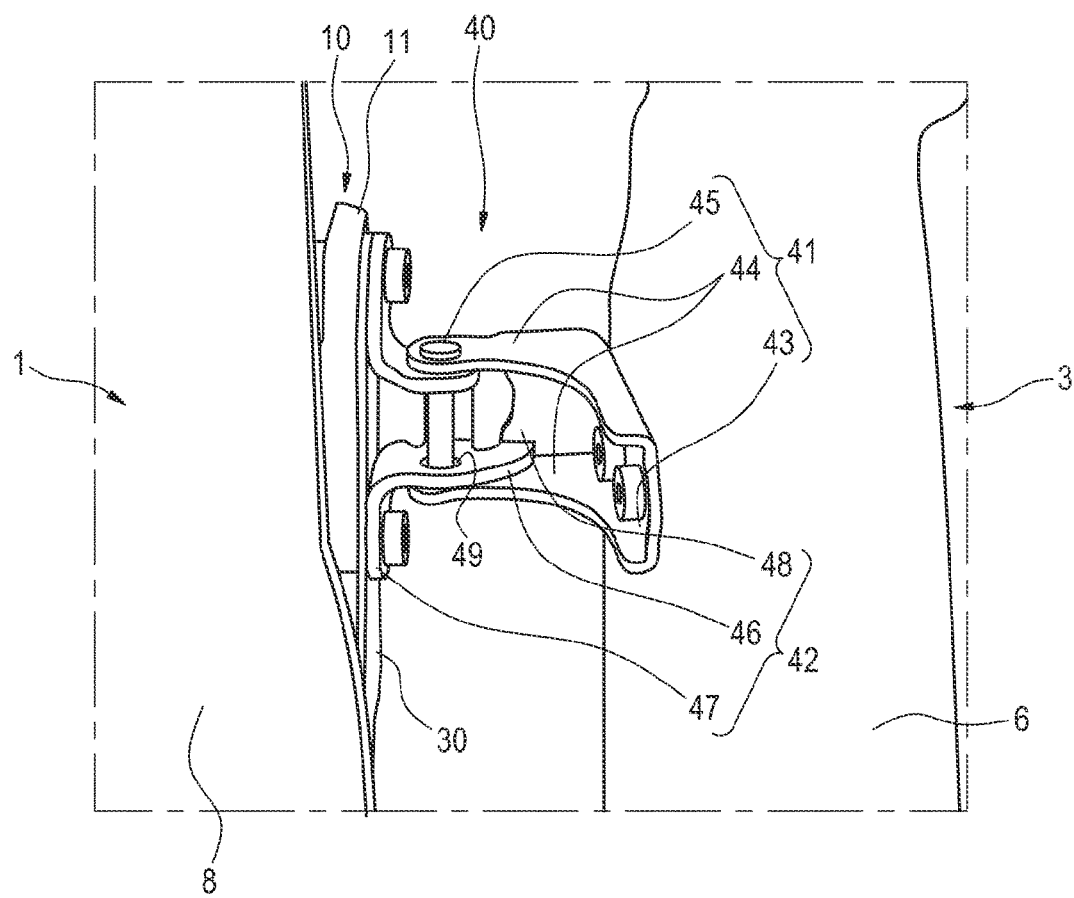
FIG. 3 is a perspective view showing a body-side upper hinge of the opening and closing device shown in FIG. 2.

FIGS. 1 to 3 show an example of an opening and closing device of an illustrative embodiment of the disclosure.

A vehicle shown in FIG. 1 includes a vehicle door 1 that is opened and closed in a width direction of the vehicle. The vehicle door 1 is connected to a vehicle body 3 so as to be opened and closed by an opening and closing device 2 provided at a door front end side. The vehicle door 1 has a latch device 4 and a closer device 5. The latch device 4 and the closer device 5 are provided at a door rear end side.

The latch device 4 is designed to be brought into engagement with a striker (not shown) on the vehicle body 3 to hold the vehicle door 1 in a closed state (a fully closed state and a half closed state). The closer device 5 drives the latch device 4 to close fully the vehicle door 1 that is held in a half closed state by the latch device 4. Known latch and closer devices are used for the latch device 4 and the closer device 5.

As shown in FIG. 2, the opening and closing device 2 includes an upper arm 10 and a lower arm 20 that are disposed so as to be spaced apart from each other in an up-and-down direction of the vehicle, a connecting member 30, a body-side upper hinge 40 and a body-side lower hinge 50 that are attached to the vehicle body 3, a door-side upper hinge 60 and a door-side lower hinge 70 that are attached to the vehicle door 1, a reinforcement member 80 and a powered driving device 90.

The upper arm 10 and the lower arm 20 are provided to extend between the vehicle door 1 and the vehicle body 3. A first end portion 11 of the upper arm 10 that is disposed on the vehicle body 3 side and a first end portion 21 of the lower arm 20 that is also disposed on the vehicle body 3 side are connected to each other by the connecting member 30, and the connecting member 30 is supported by the body-side upper hinge 40 and the body-side lower hinge 50. The body-side upper hinge 40 and the body-side lower hinge 50 are attached to the vehicle body 3 and are disposed so as to be spaced apart from each other in the up-and-down direction of the vehicle at a door frame front end portion that overlaps a door front end portion of the vehicle door 1 when the vehicle door 1 is fully closed.

FIG. 3 shows the body-side upper hinge 40 in an enlarged fashion, and the body-side upper hinge 40 has a hinge female portion 41 and a hinge male portion 42.

The hinge female portion 41 includes a base portion 43, a pair of shaft holding members 44, and a hinge shaft 45. The base portion 43 is detachably fixed to a door frame 6 of the vehicle body 3 with a bolt or the like. The pair of shaft holding members 44 is provided integrally with the base member 43 and is disposed so as to be space apart while facing each other. The hinge shaft 45 is provided to extend between the pair of shaft holding members 44 and is held by the pair of shaft holding members 44.

The hinge male portion 42 includes a pair of bearing portions 46, and a pair of flange portions 47. The pair of bearing portions 46 is held between the pair of shaft holding portions 44 and is disposed so as to be space apart while facing each other. The pair of bearing portions is connected together by a connecting portion 48. A through hole 49 is formed in each of the pair of bearing portions 46, and the hinge shaft 45 is passed through the through holes 49. The pair of bearing portions 46 can rotate about the hinge shaft 45. The pair of flange portions 47 extends outwards of the pair of shaft holding portions 44 from the pair of bearing portions 46 and is fixed to the connecting member 30.

Referring to FIG. 2, the body-side lower hinge 50 is configured similarly to the body-side upper hinge 40 and has a hinge female portion 51 and a hinge male portion 52. The hinge female portion 51 includes a base portion, a pair of shaft holding portions and a hinge shaft 55. The hinge male portion 52 includes a pair of bearing portions and a pair of flange portions.

With the body-side upper hinge 40 and the body-side lower hinge 50 attached to the door frame 6 of the vehicle body 3, the hinge shaft 45 of the body-side upper hinge 40 and the hinge shaft 55 of the body-side lower hinge 50 are disposed on the same straight line that extends in the up-and-down direction of the vehicle to form a first rotational axis X1. The upper arm 10 and the lower arm 20 that are supported by the body-side upper hinge 40 and the body-side lower hinge 50 via the connecting member 30 respectively can rotate about this first rotational axis X1 relative to the vehicle body 3.

In this illustrative embodiment where the hinge female portions 41, 51 are fixed detachably to the vehicle body 3 with the bolts or the like, the vehicle door 1 is attached to and detached from the vehicle body 3 as a result of the hinge female portions 41, 51 being attached to and detached from the vehicle body 3. However, as in a hinge attaching construction of a door that is described in Japanese Patent No. 4838218, the vehicle door 1 may be attached to and detached from the vehicle body 3 as a result of the hinge male portions 42, 52 being attached to and detached from the connecting member 30. Additionally, as in a motor vehicle door hinge fabrication method that is described in PCT/JP2018/010319 that is an international application filed by the applicant of this patent application, the vehicle door 1 may be attached to and detached from the vehicle body 3 as a result of the hinge male portions 42, 52 being attached to and detached from the hinge female portions 41, 51, respectively.

A second end portion 12 of the upper arm 10 that is disposed on the vehicle door 1 side is supported by the door-side upper hinge 60, and a second end portion 22 of the lower arm 20 that is disposed on the vehicle door 1 side is supported by the door-side lower hinge 70. The door-side upper hinge 60 and the door-side lower hinge 70 are attached to the vehicle door 1 and are disposed so as to be spaced apart from each other in the up-and-down direction of the vehicle at a central portion in a front-and-rear direction of the vehicle door 1.

The door-side upper hinge 60 has a hinge female portion 61 and a hinge male portion 62. The hinge female portion 61 includes a base portion 63, a pair of shaft holding portions 64 and a hinge shaft 65. The base portion 63 is fixed detachably to an inner panel 7 of the vehicle door 1 with a bolt or the like. The pair of shaft holding portions 64 is provided integrally with the base portion 63 and is disposed so as to be space apart while facing each other. The hinge shaft 65 is provided to extend between the pair of shaft holding portions 64 and is held by the pair of shaft holding portions 64.

The hinge male portion 62 is made up of the second end portion 12 of the upper arm 10. A through hole is formed in the second end portion 12, and the hinge shaft 65 is passed through this through hole. The second end portion 12 of the upper arm 10 can rotate about the hinge shaft 65.

The door-side lower hinge 70 is configured similarly to the door-side upper hinge 60 and has a hinge female portion 71, and a hinge male portion 72. The hinge female portion 71 includes a base portion 73, a pair of shaft holding portions 74 and a hinge shaft 75. The hinge male portion 72 is made up of the second end portion 22 of the lower arm 20.

With the door-side upper hinge 60 and the door-side lower hinge 70 attached to the inner panel 7 of the vehicle door 1, the hinge shaft 65 of the door-side upper hinge 60 and a hinge shaft 75 of the door-side lower hinge 70 are disposed on the same straight line that extends in the up-and-down direction of the vehicle to form a second rotational axis X2. The upper arm 10 and the lower arm 20 that are supported by the door-side upper hinge 60 and the door-side lower hinge 70 respectively can rotate about this second rotational axis X2 relative to the vehicle door 1.

The reinforcement member 80 is fixed to a location on the inner panel 7 of the vehicle door 1 where the door-side upper hinge 60 is attached and a location on the inner panel 7 where the door-side lower hinge 70 is attached and reinforces the inner panel 7. In this illustrative embodiment, the reinforcement member 80 is disposed between the inner panel 7 and an outer panel 8 of the vehicle door 1 and does not interfere with a door window glass 9 (refer to FIG. 1) housed between the inner panel 7 and the outer panel 8 (refer to FIG. 1).

The powered driving device 90 rotates the upper arm 10 and the lower arm 20 about the first rotational axis X1 relative to the vehicle body 3 and rotates the upper arm 10 and the lower arm 20 about the second rotational axis X2 relative to the vehicle door 1. In this illustrative embodiment, the powered driving device 90 has a first driving device 91, a second driving device 92, a first link 93 and a second link 94. The first driving device 91 and the second driving device 92 each include a motor and an electromagnetic brake and are controlled by a controller, which will be described later. The first driving device 91 and the second driving device 92 are attached to the connecting member 30 via a bracket 31 and are disposed between the upper arm 10 and the lower arm 20.

The first link 93 is provided to extend between an output shaft of the first driving device 91 and the vehicle body 3. The first link 93 operates in response to a rotation of the output shaft of the first driving device 91 to draw or forcibly displace the vehicle body 3. This causes the upper arm 10 and the lower arm 20 to rotate about the first rotational axis X1. The second link 94 is provided to extend between an output shaft of the second driving device 92 and the vehicle door 1. The second link 94 operates in response to a rotation of the output shaft of the second driving device 92 to draw or forcibly displace the vehicle door 1. This causes the upper arm 10 and the lower arm 20 to rotate about the second rotational axis X2.

Figure 4:
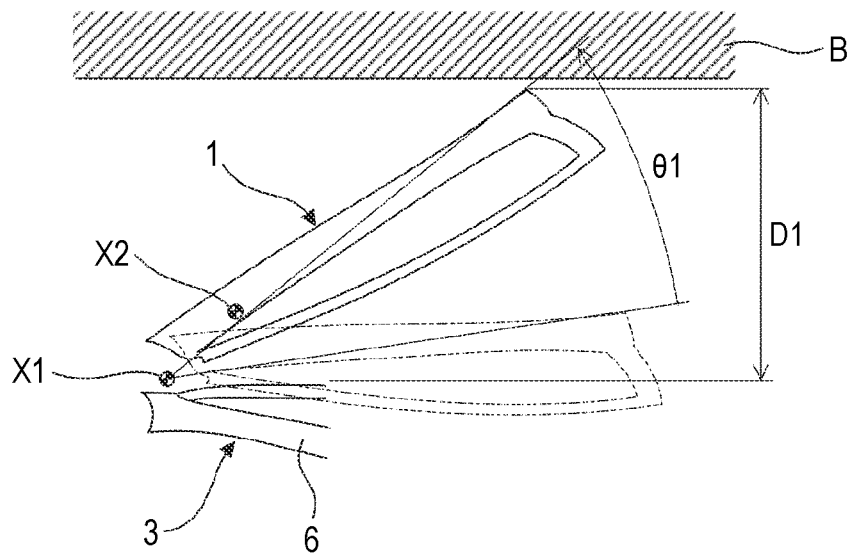
FIG. 4 is a schematic drawing showing an opening operation of a vehicle door.
Figure 5:
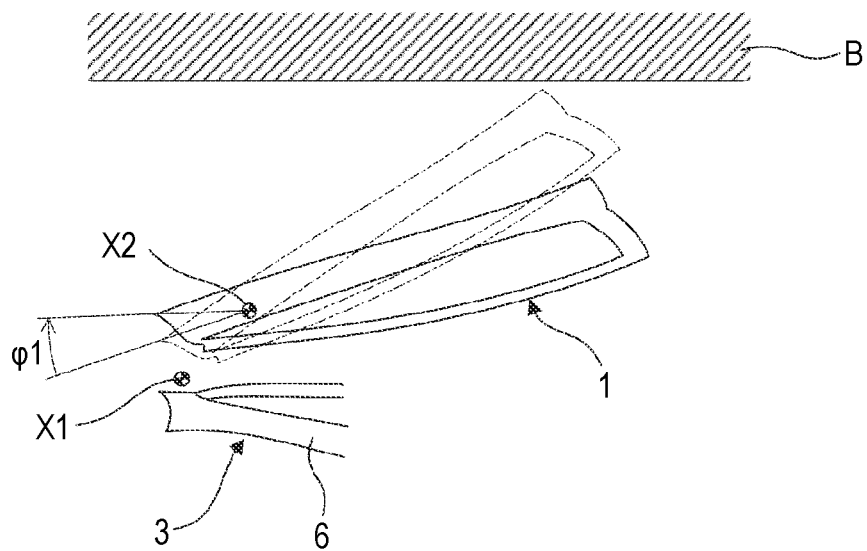
FIG. 5 is a schematic drawing showing an opening operation of the vehicle door.
Figure 6:
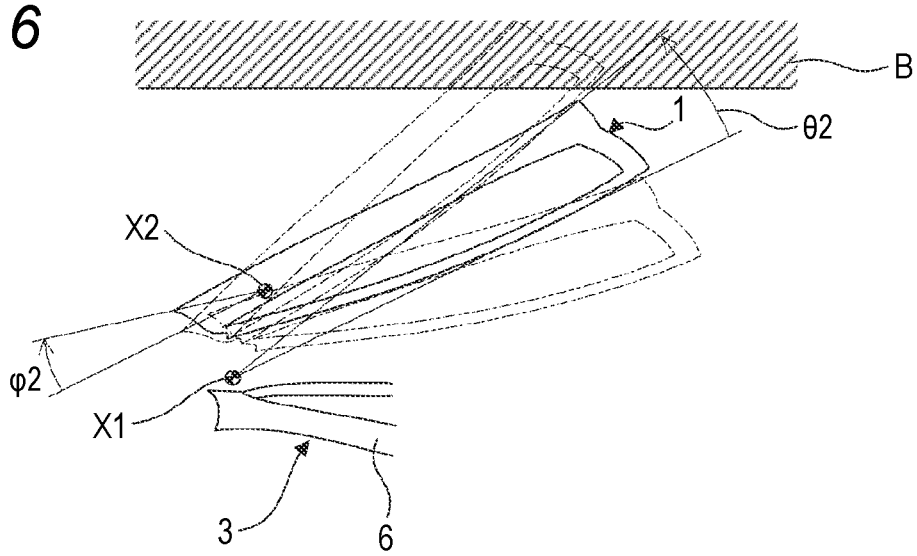
FIG. 6 is a schematic drawing showing an opening operation of the vehicle door.

FIGS. 4 to 6 show schematically opening operations of the vehicle door 1.

FIG. 4 shows a case where the vehicle door 1 is opened fully from a fully closed state as a result of the upper arm 10 and the lower arm 20 of the opening and closing device 2 being caused to rotate about the first rotational axis X1. When the vehicle door 1 is fully closed, the first rotational axis X1 is positioned at the door front end portion of the vehicle door 1. Consequently, when the vehicle door 1 is opened as a result of the upper arm 10 and the lower arm 20 being caused to rotate about the first rotational axis X1, a distance between the vehicle door 1 and the door frame 6 increases gradually from the door front end side towards the door rear end side. Here, a distance between the door rear end portion of the vehicle door 1 and the door frame 6 when the vehicle door 1 is opened directly before the door rear end portion of the vehicle door 1 comes into contact with an obstacle B that exists to a side of the vehicle is referred to as D1.

FIG. 5 shows a case where the upper arm 10 and the lower arm 20 of the opening and closing device 2 are caused to rotate about the second rotational axis X2 from the state shown in FIG. 4 where the vehicle door 1 is opened. The distance D1 between the door rear end portion of the vehicle door 1 and the door frame 6 is reduced as a result of the upper arm 10 and the lower arm 20 being caused to rotate about the second rotational axis X2, whereas the distance between the door front end portion of the vehicle door 1 and the door frame 6 is increased. Then, a distance between the door rear end portion of the vehicle door 1 and the obstacle B is increased as a result of the distance between the door rear end portion of the vehicle door 1 and the door frame 6 being reduced, whereby an extra room for the vehicle door 1 to be opened more is generated.

Then, as shown in FIG. 6, the vehicle door 1 is opened more as a result of the upper arm 10 and the lower arm 20 of the opening and closing device 2 being caused to rotate about the first rotational axis X1 and being caused to rotate about the second rotational axis X2 at the same time. When the vehicle door 1 is opened until the distance between the door rear end portion of the vehicle door 1 and the door frame 6 becomes D1, the distance between the door front end portion of the vehicle door 1 and the door frame 6 is increased more than when the vehicle door 1 is opened as shown in FIG. 4. This ensures a space which is wide enough for the driver or occupant to get in and out of the vehicle even in a place where the degree of opening of the vehicle door 1 is limited.

In the opening and closing device 2 that has been described heretofore, the body-side upper hinge 40 and the body-side lower hinge 50 are connected together by the connecting member 30, whereby the body-side upper hinge 40 and the body-side lower hinge 50 are restricted from being displaced independently of each other. This prevents one of the hinge shaft 45 of the body-side upper hinge 40 and the hinge shaft 55 of the body-side lower hinge 50 from being inclined to the other, whereby the vehicle door 1 is opened and closed smoothly in association with the rotation of the upper arm 10 and the lower arm 20 about the first rotational axis X1.

Further, in the opening and closing device 2, a rectangular frame member is formed by the connecting member 30, the upper arm 10 and the lower arm 20, and the reinforcement member 80, and the door-side upper hinge 60 and the door-side lower hinge 70 are restricted from being displaced independently of each other based on the rigidity of the frame member. This prevents one of the hinge shaft 65 of the door-side upper hinge 60 and the hinge shaft 75 of the door-side lower hinge 70 from being inclined relative to the other, whereby the vehicle door 1 is opened and closed smoothly in association with the rotation of the upper arm 10 and the lower arm 20 about the second rotational axis X2.

Additionally, in the opening and closing device 2, the first driving device 91 and the second driving device 92 of the powered driving device 90 are attached to the connecting member 30 via the bracket 31. This enables the opening and closing device 2 to easily be applied to an existing vehicle body 3.

Figure 7:
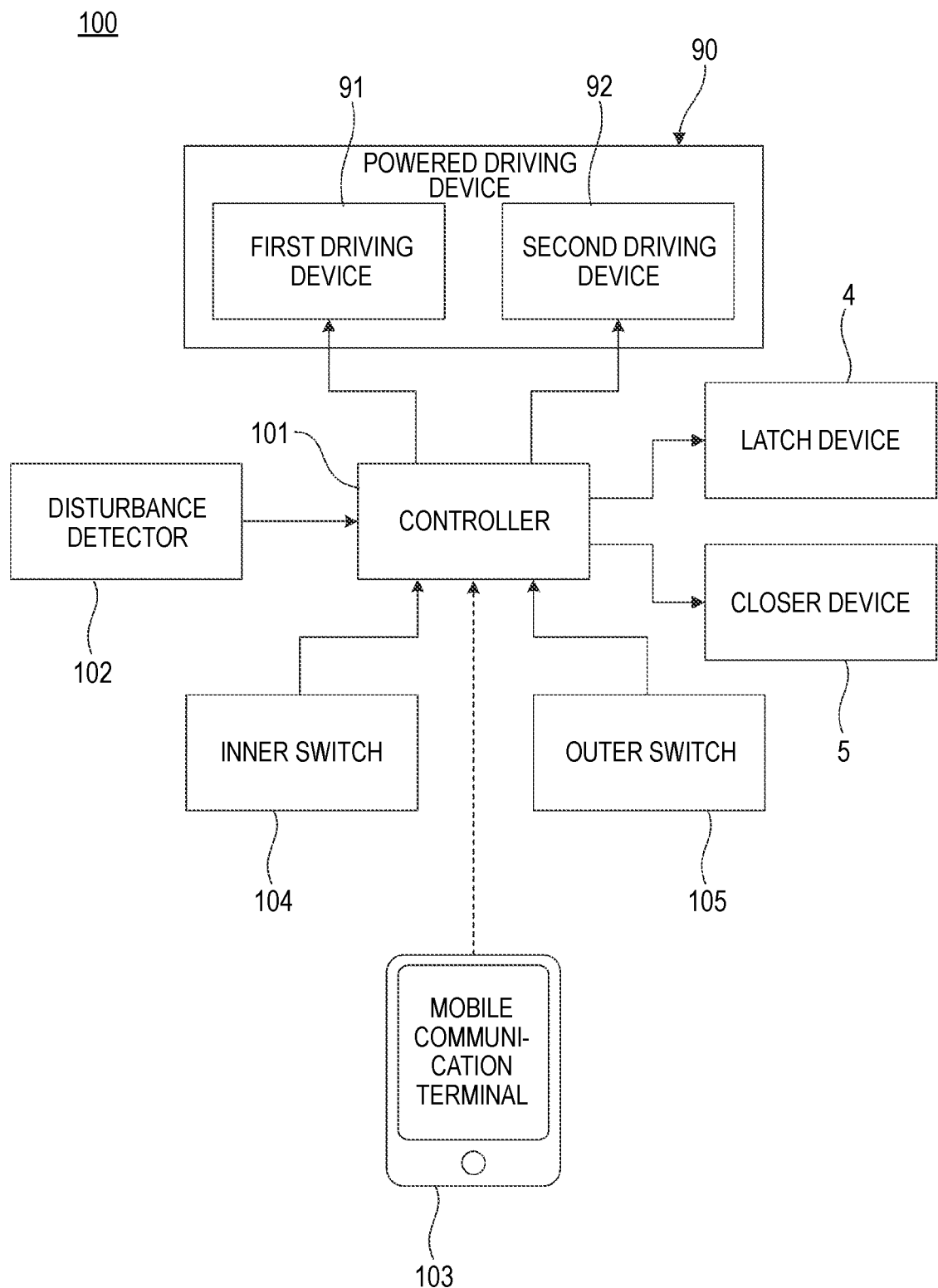
FIG. 7 is a functional block diagram of an example of an opening and closing system that illustrates the illustrative embodiment of the disclosure.

FIG. 7 is a functional block diagram of an opening and closing system 100 that includes the opening and closing device 2.

The opening and closing system 100 includes the latch device 4, the closer device 5, the powered driving device 90 (the first driving device 91 and the second driving device 92), a controller 101 for controlling the latch device 4, the closer device 5 and the powered driving device 90, and instruction devices such as a disturbance detector 102 detecting disturbance acting in opening and closing direction against the vehicle door 1, a mobile communication terminal 103, an inner switch 104 that is provided on an inner side of the vehicle door 1 and an outer switch 105 that is provided on an outer side of the vehicle door 1.

The disturbance detector 102 detects a disturbance that acts on the vehicle door 1 in opening and closing directions. A gravitational force that acts on the vehicle door 1 in the opening and closing directions as a result of an inclination of the vehicle can be raised as an example of a disturbance. A gravitational force acting in the opening and closing directions can be detected by using, for example, an inclination sensor (an acceleration sensor). In addition, a wind pressure borne by the vehicle door 1 can also be raised as a disturbance, and a wind pressure can be detected by using, for example, a pressure sensor.

The mobile communication terminal 103 is made up of storage media such as a ROM, a RAM and a flash memory and a processor such as a CPU and outputs an instruction for the controller 101 based on an operation performed on the mobile communication terminal 103 as a result of the processor operating according to control programs and control data that are stored on the storage media. The mobile communication terminal 103 is, for example, a smart phone, and the control programs are provided by being downloaded via, for example, a network.

The controller 101 is made up of storage media such as a read only memory (ROM), a random access memory (RAM) and a flash memory and a processor such as a central processing unit (CPU) and controls the latch device 4, the closer device 5 and the powered driving device 90 based on instructions inputted from the instruction devices such as the mobile communication terminal 103, the inner switch 104 and the outer switch 105 as a result of the processor operating according to control programs and control data that are stored on the storage media. The latch device 4 includes a release actuator that is controlled by the controller 101 and releases the vehicle door 1 held in a closed state as a result of the release actuator being operated. The closer device 5 also includes an actuator that is controlled by the controller 101 and closes fully the vehicle door 1 held in a half closed state by the latch device 4 as a result of the actuator being operated.

Instructions that the instruction devices such as the mobile communication terminal 103, the inner switch 104 and the outer switch 105 outputs to the controller 101 include, for example, instructions to open and close the vehicle door 1 and also include stop instructions to stop an opening and a closing of the vehicle door 1. Then, instructions that the mobile communication terminal 103 outputs include further setting instructions to set a rotational angle $\Theta(\Theta=\theta1+\theta2$: refer to FIGS. 4, 6) at which the upper arm 10 and the lower arm 20 rotate about the first rotational axis X1 when the vehicle door 1 is opened and to set a rotational angle $\Phi$ ($\Phi=\phi1+\phi2$: refer to FIGS. 5, 6) at which the upper arm 10 and the lower arm 20 rotate about the second rotational axis X2 when the vehicle door 1 is opened. The rotational angles $\Theta$, $\Phi$ so set are then stored on the storage media of the controller 101 as control data.

Figure 8:
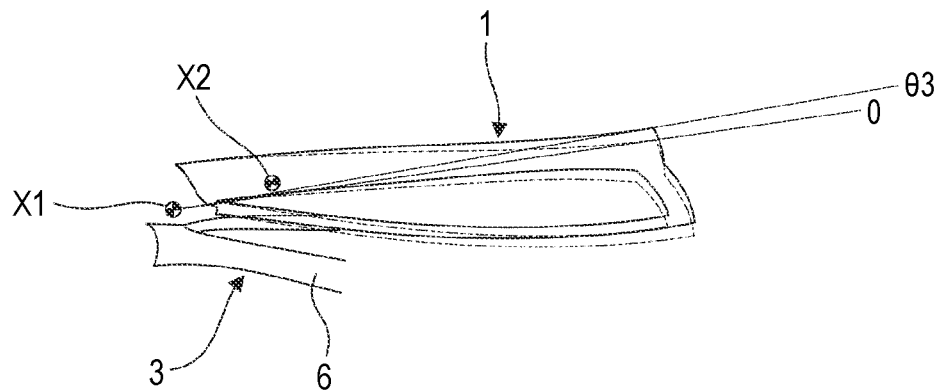
FIG. 8 is a schematic drawing showing an example of an opening operation of a vehicle door that is opened by the opening and closing system shown in FIG. 7.
Figure 9:
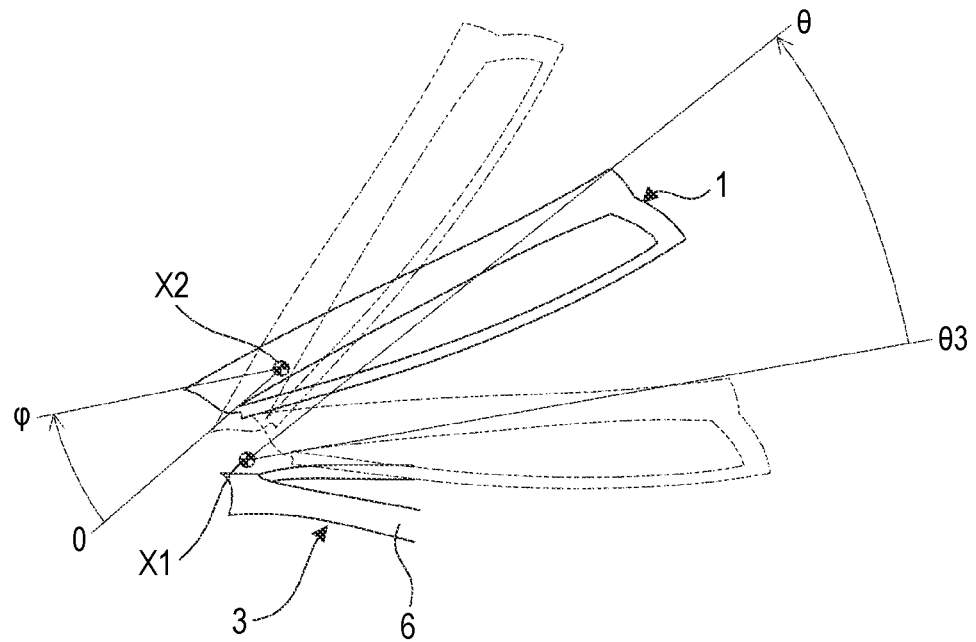
FIG. 9 is a schematic drawing showing an example of an opening operation of the vehicle door that is opened by the opening and closing system shown in FIG. 7.

FIGS. 8 and 9 show an example of an opening operation of the vehicle door 1 that is opened by the opening and closing system 100.

Thus, as has been described heretofore, the upper arm 10 and the lower arm 20 of the opening and closing device 2 are caused to rotate about the first rotational axis X1 and are caused to rotate about the second rotational axis X2 at the same time, whereby the vehicle door 1 is opened. However, it is preferable that the upper arm 10 and the lower arm 20 are caused to rotate only about the first rotational axis X1 until the vehicle door 1 that is held by the latch device 4 is released as a result of the engagement of the latch device 4 (refer to FIG. 1) with the striker of the vehicle body 3 being released.

A rotational angle $\theta$ at which the upper arm 10 and the lower arm 20 are caused to rotate about the first rotational axis X1 when the vehicle door 1 that is held by the latch device 4 is released is referred to as $\theta3$. Then, as shown in FIG. 8, the controller 101 causes the upper arm 10 and the lower arm 20 to rotate about the first rotational axis X1 until the angle $\theta3$ is reached by operating the motor installed in the first driving device 91. The controller 101 operates the electromagnetic brake installed in the second driving device 92 to lock rotations of the upper arm 10 and the lower arm 20 about the second rotational axis X2 while the upper arm 10 and the lower arm 20 are rotating only about the first rotational axis X1. The upper arm 10 and the lower arm 20 may also be caused to rotate about the first rotational axis X1 until the angle $\theta3$ is reached by virtue of an elastic force of a seal material that seals up a gap between the vehicle door 1 and the door frame 6 of the vehicle body 3.

Then, the controller 101 causes the upper arm 10 and the lower arm 20 to rotate about the first rotational axis X1 to the set angle $\Theta$ by operating the motor installed in the first driving device 91, as shown in FIG. 9, after the rotational angle $\theta$ of the upper arm 10 and the lower arm 20 about the first rotational axis X1 reaches the angle $\theta3$. At the same time, the controller 101 causes the upper arm 10 and the lower arm 20 to rotate about the second rotational axis X2 to the set angle $\Phi$ by operating the motor installed in the second driving device 92.

In this way, the upper arm 10 and the lower arm 20 are caused to rotate about the first rotational axis X1 until the vehicle door 1 that is held by the latch device 4 is released, whereby the engagement of the latch device 4 with the striker of the vehicle body 3 can be released smoothly.

Figure 10:
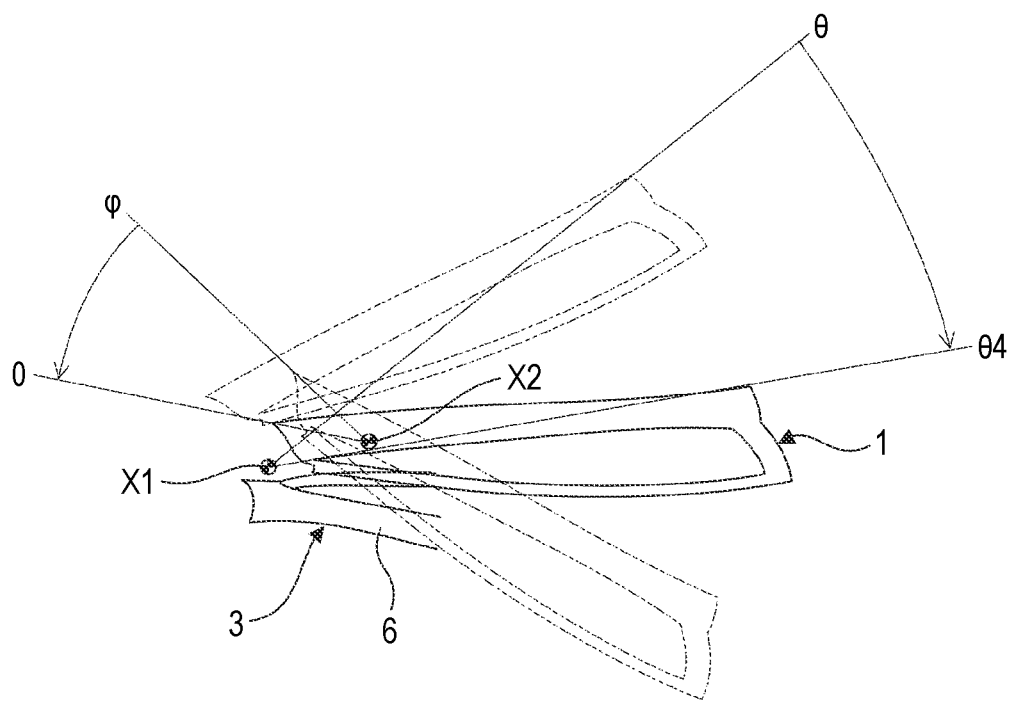
FIG. 10 is a schematic drawing showing an example of an opening operation of a vehicle door that is closed by the opening and closing system shown in FIG. 7.
Figure 11:
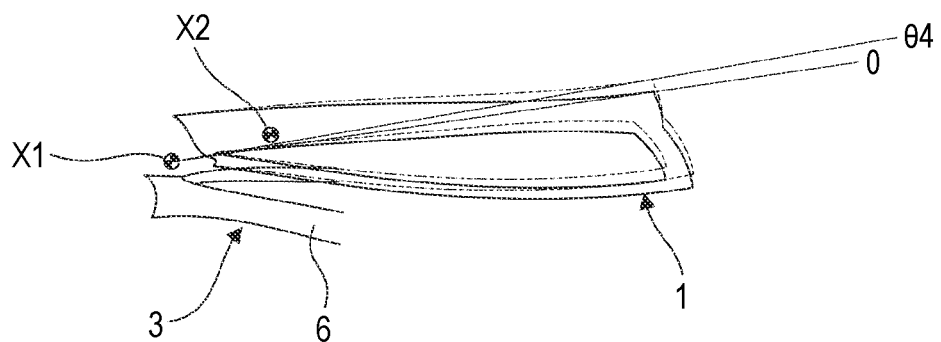
FIG. 11 is a schematic drawing showing an example of an opening operation of the vehicle door that is closed by the opening and closing system shown in FIG. 7.

FIGS. 10 and 11 show an example of a closing operation of the vehicle door 1 that is closed by the opening and closing system 100.

When the vehicle door 1 is closed, it is preferable that the upper arm 10 and the lower arm 20 are caused to rotate about the first rotational axis X1 and are also caused to rotate about the second rotational axis X2 at the same time until the latch device 4 is brought into engagement with the striker of the vehicle body 3, whereby the vehicle door 1 is held in a half closed state by the latch device 4. Then, the upper arm 10 and the lower arm 20 are caused to rotate only about the first rotational axis X1 after the vehicle door 1 is held in the half closed state by the latch device 4.

A rotational angle $\theta$ at which the upper arm 10 and the lower arm 20 are caused to rotate about the first rotational axis X1 when the vehicle door 1 is held in the half closed state by the latch device 4 is referred to as $\theta4$. Then, as shown in FIG. 10, the controller 101 causes the upper arm 10 and the lower arm 20 to rotate about the first rotational axis X1 until the angle θ4 is reached and causes the upper arm 10 and the lower arm 20 to rotate about the second rotational axis X2 until an angle 0 is reached.

The controller 101 locks rotations of the upper arm 10 and the lower arm 20 about the second rotational axis X2 by operating the electromagnetic brake installed in the second driving device 92 and causes the upper arm 10 and the lower arm 20 to rotate only about the first rotational axis X1 to the angle 0. This allows the vehicle door 1 to be held in a fully closed state by the latch device 4. The rotations of the upper arm 10 and the lower arm 20 about the first rotational axis X1 after the vehicle door 1 is held in the half closed state by the latch device 4 are executed by the closer device 5.

In this way, the upper arm 10 and the lower arm 20 are caused to rotate only about the first rotational axis X1 after the vehicle door 1 is held in the half closed state by the latch device 4, whereby the latch device 4 can be brought into engagement with the striker of the vehicle body 3 smoothly.

In the opening operation and the closing operation of the vehicle door 1 described heretofore, the controller 101 activates the motor and the electromagnetic brake of each of the first driving device 91 and the second driving device 92 to operate based on the rotational angles (positions) of the upper arm 10 and the lower arm 20. However, the electromagnetic brakes are also activated to operate based on a result of a detection executed by the disturbance detector 102.

In the case where a gravitational force acts in the opening direction of the vehicle door 1 as a result of, for example, an inclination of the vehicle, when a force acting in the opening direction that is detected by the disturbance detector 102 exceeds a predetermined threshold, when the vehicle door 1 is closed, the controller 101 activates the electromagnetic brake installed in the first driving device 91 to operate to brake the vehicle door 1. This will be true when the vehicle door 1 bears a wind pressure in the opening direction of the vehicle door 1. When a force in the opening direction that is detected by the disturbance detector 102 exceeds a predetermined threshold, the controller 101 activates the electromagnetic brake installed in the first driving device 91 to operate to brake the vehicle door 1 when the vehicle door 1 is opened. This can prevent a quick opening of the vehicle door 1 to thereby prevent the vehicle door 1 from being brought into contact with the obstacle B.

In addition, with the gravitational force acting in the closing direction of the vehicle door 1, when a force acting in the closing direction that is detected by the disturbance detector 102 exceeds a predetermined threshold, the controller 101 activates the electromagnetic brake installed in the first driving device 91 to operate to thereby brake the vehicle door 1 when the vehicle door 1 is closed. This will be true when the vehicle door 1 bears a wind pressure in the closing direction. When a force in the closing direction that is detected by the disturbance detector 102 exceeds a predetermined threshold, the controller 101 activates the electromagnetic brake installed in the first driving device 91 to operate to thereby brake the vehicle door 1 when the vehicle door 1 is closed. This can prevent a quick opening and closing of the vehicle door 1 to thereby prevent the driver or occupant from being caught between the vehicle door 1 and the vehicle body 3.

Here, the powered driving device 90 of the opening and closing device 2 is described as having the first driving device 91 and the second driving device 92. However, the disclosure is not limited thereto, and hence, the powered driving device may be made up of one driving device.

Figure 12:
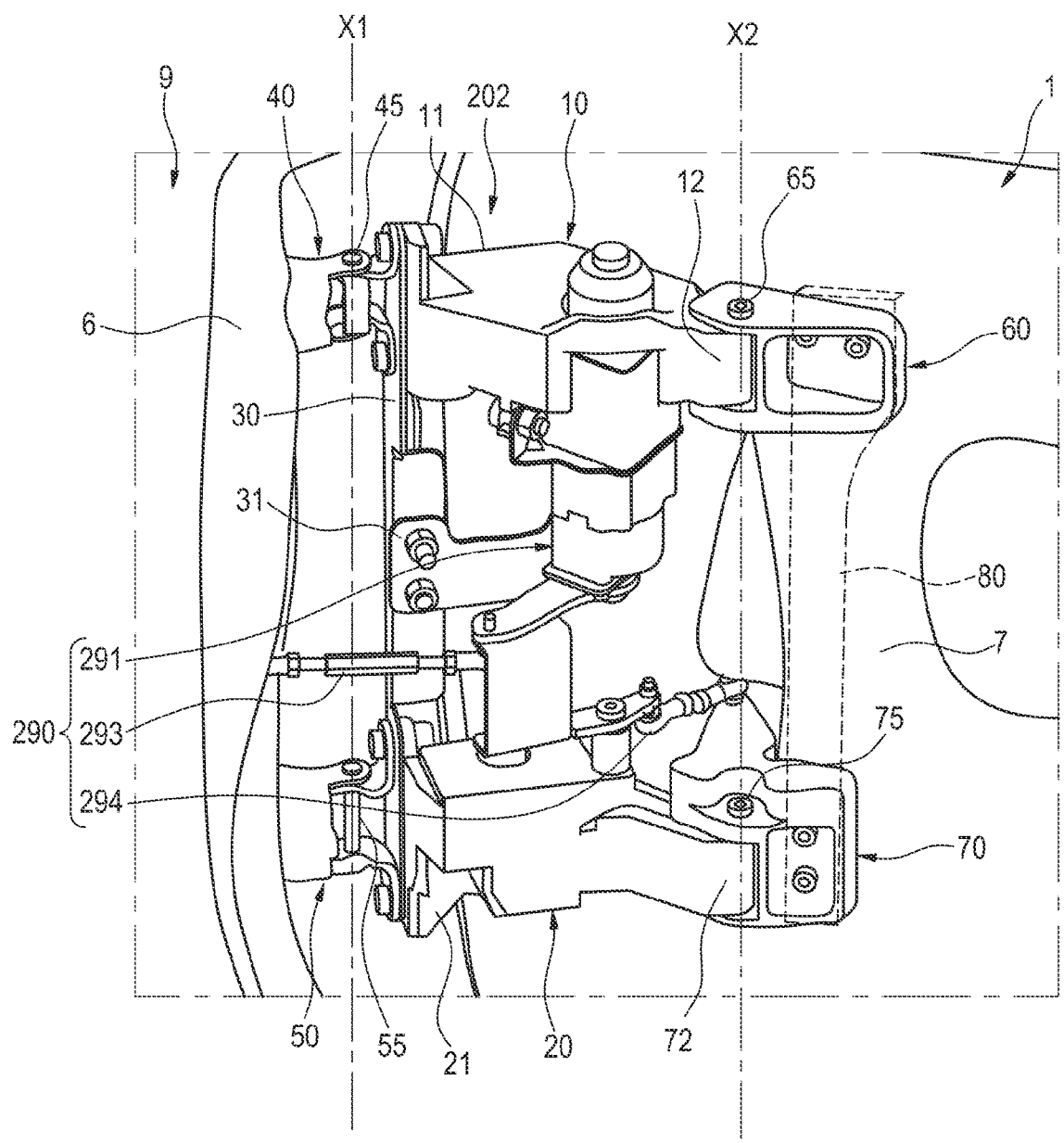
FIG. 12 is a schematic drawing of a modified example of the opening and closing device of the illustrative embodiment of the disclosure.

FIG. 12 shows a modified example of the opening and closing device 2 that has been described heretofore. Like reference numerals will be given to elements like to those of the opening and closing device 2, and the description thereof will be omitted here.

An opening and closing device 202 shown in FIG. 12 includes a powered driving device 290 that causes an upper arm 10 and a lower arm 20 to rotate about a first rotational axis X1 relative to a vehicle body 3 and causes the upper arm 10 and the lower arm 20 to rotate about a second rotational axis X2 relative to a vehicle door 1. The powered driving device 290 has a motor, one driving device 291 including an electromagnetic brake, a first link 293 and a second link 294. The driving device 291 is attached to a connecting member 30 via a bracket 31 and is disposed between the upper arm 10 and the lower arm 20.

The first link 293 is provided to extend between an output shaft of the driving device 291 and the vehicle body 3. The first link 293 is activated to operate in response to a rotation of an output shaft of the driving device 291 to draw or forcibly displace the vehicle body 3. This causes the upper arm 10 and the lower arm 20 to rotate about the first rotational axis X1.

The second link 294 is provided to extend between the output shaft of the driving device 291 and the vehicle door 1. The second link 294 is activated to operate in response to a rotation of the output shaft of the driving device 291 to draw or forcibly displace the vehicle door 1. This causes the upper arm 10 and the lower arm 20 to rotate about a second rotational axis X2.

A rotational angle θ at which the upper arm 10 and the lower arm 20 are caused to rotate about the first rotational axis X1 in response to the rotation of the output shaft of the driving device 291 and a rotational angle at which the upper arm 10 and the lower arm 20 are caused to rotate about the second rotational axis X2 in response to the rotation of the output shaft of the driving device 291 are set as required based on a link length of the first link 293 and a link length of the second link 294.

The powered driving device 290 is made up of the motor and the driving device 291 including the electromagnetic brake, thereby making it possible to reduce the size and weight of the opening and closing device 202.

The foregoing description of the illustrative embodiments of the present disclosure has been provided for the purposes of illustration and description. It is not intended to be exhaustive or to limit the disclosure to the precise forms disclosed. Obviously, many modifications and variations will be apparent to practitioners skilled in the art. The illustrative embodiments were chosen and described in order to best explain the principles of the disclosure and its practical applications, thereby enabling others skilled in the art to understand the disclosure for various illustrative embodiments and with the various modifications as are suited to the particular use contemplated. It is intended that the scope of the disclosure be defined by the following claims and their equivalents.

What is claimed is:

1. An opening and closing device for connecting a vehicle door to a vehicle body so as to be openable and closable in a width direction of a vehicle, the opening and closing device comprising:

an upper arm and a lower arm that are disposed so as to be spaced apart in an up-and-down direction of the vehicle and to extend between the vehicle door and the vehicle body;

a connecting member configured to connect a first end portion of the upper arm and a first end portion of the lower arm together;

a body-side upper hinge and a body-side lower hinge that are attached to the vehicle body so as to be spaced apart in the up-and-down direction of the vehicle and to support the connecting member rotatably, wherein the connecting member is directly connected to and extends from at least a portion of the body-side upper hinge and at least a portion of the body-side lower hinge;

a door-side upper hinge attached to an inner panel of the vehicle door to support a second end portion of the upper arm rotatably; and a door-side lower hinge attached to the inner panel of the vehicle door to support a second end portion of the lower arm rotatably.

2. The opening and closing device according to claim 1, further comprising:

a reinforcement member fixed to a first portion of the inner panel of the vehicle to which the door-side upper hinge is attached and a second portion of the inner panel of the vehicle to which the door-side lower hinge is attached so as to reinforce the inner panel.

3. The opening and closing device according to claim 2, wherein the connecting member, the upper arm and the lower arm, and the reinforcement member configure a rectangular frame.

4. The opening and closing device according to claim 3, wherein the rectangular frame is configured by the connecting member, the upper arm and the lower arm, the reinforcement member, the door-side upper hinge, and the door-side lower hinge.

5. The opening and closing device according to claim 1, wherein the vehicle door is connected to the vehicle body detachably at the body-side upper hinge and the body-side lower hinge.

6. The opening and closing device according to claim 1, further comprising:

a powered driving device configured to:

drive the upper arm and the lower arm to rotate about a first rotational axis relative to the vehicle body, the first rotational axis passing through the body-side upper hinge and the body-side lower hinge; and drive the upper arm and the lower arm to rotate about a second rotational axis relative to the vehicle door, the second rotational axis passing through the door-side upper hinge and the door-side lower hinge.

* * * * *